G. BRUNET.
MULTIPLE AUTOMATIC MACHINE FOR CUTTING BARS OF SOAP OR SIMILAR PRODUCTS INTO PIECES, AND PRESSING THE PIECES OBTAINED.
APPLICATION FILED SEPT. 24, 1919.
1,361,439.
Patented Dec. 7, 1920.
5 SHEETS—SHEET 1.
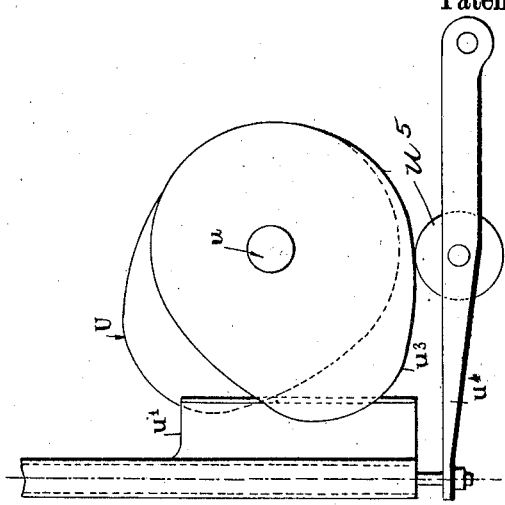
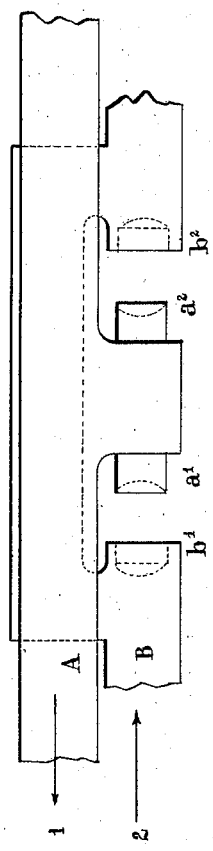
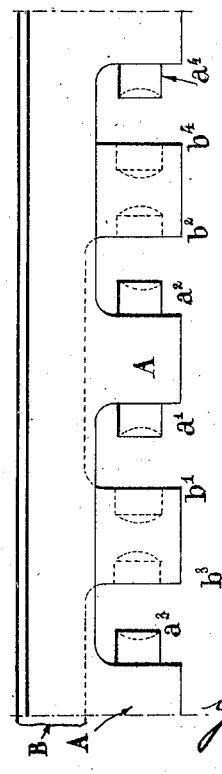

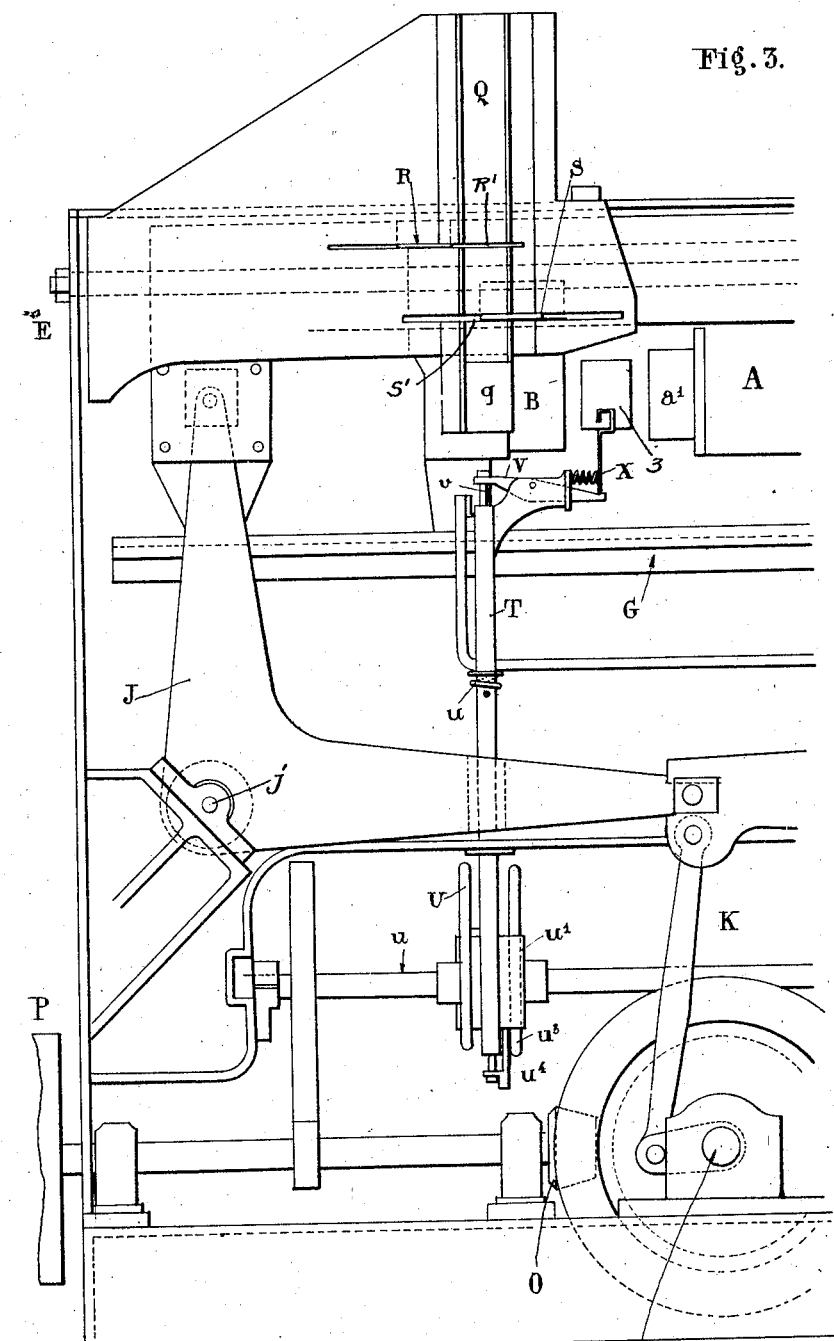

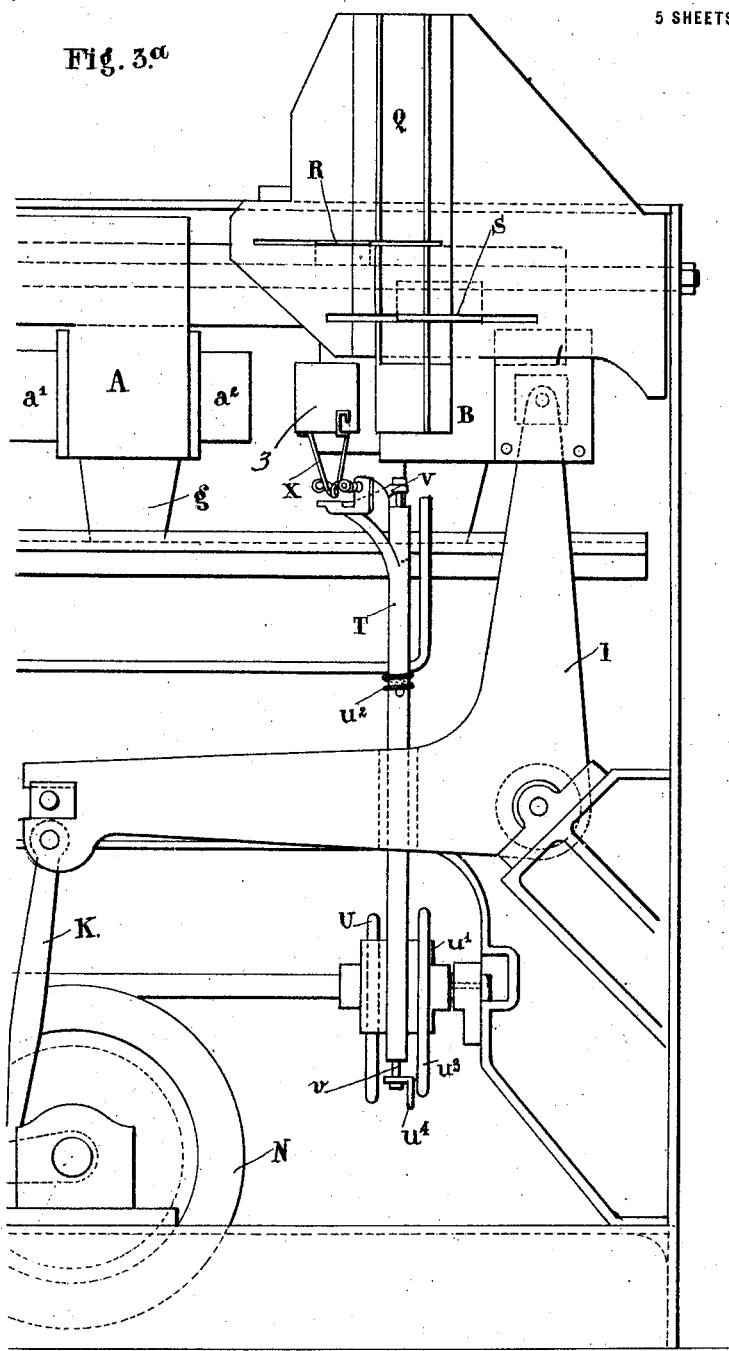

G. BRUNET.
MULTIPLE AUTOMATIC MACHINE FOR CUTTING BARS OF SOAP OR SIMILAR PRODUCTS INTO PIECES, AND PRESSING THE PIECES OBTAINED.
APPLICATION FILED SEPT. 24, 1919.

1,361,439.

Patented Dec. 7, 1920.

Inventor:
Gustave Brunet

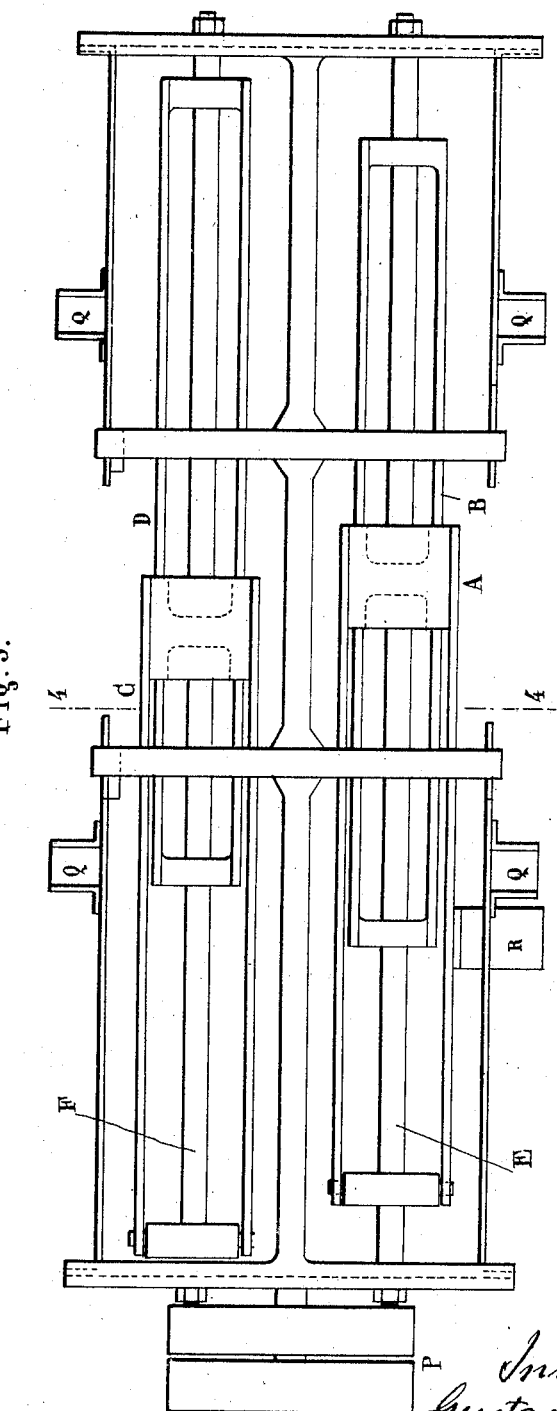

UNITED STATES PATENT OFFICE.

GUSTAVE BRUNET, OF BRUSSELS, BELGIUM.

MULTIPLE AUTOMATIC MACHINE FOR CUTTING BARS OF SOAP OR SIMILAR PRODUCTS INTO PIECES, AND PRESSING THE PIECES OBTAINED.

1,361,439.

Specification of Letters Patent.

Patented Dec. 7, 1920.

Application filed September 24, 1919. Serial No. 325,970.

*To all whom it may concern:*

Be it known that I, GUSTAVE BRUNET, a citizen of the Republic of France, residing at Brussels, in the Kingdom of Belgium, have invented certain new and useful Improvements in Multiple Automatic Machines for Cutting Bars of Soap or Similar Products into Pieces, and Pressing the Pieces Obtained, of which the following is a specification.

This invention relates to a multiple automatic machine for cutting bars of soap or similar products into pieces and pressing the pieces obtained.

The new machine has a double action, *i. e.* at each stroke it molds a piece of soap. The special features of my machine are its manner of cutting and distributing the pieces of soap, these operations being entirely automatic and being carried out in a very simple manner.

A machine constructed according to the invention is shown on the accompanying drawings, in which:

Figures 1 and 2 are diagrams of the action of the machine;

Fig. 3 is an elevation of the machine;

Fig. 5 is a plan of the machine;

Fig. 6 is a view of a detail on a larger scale.

Figure 4:
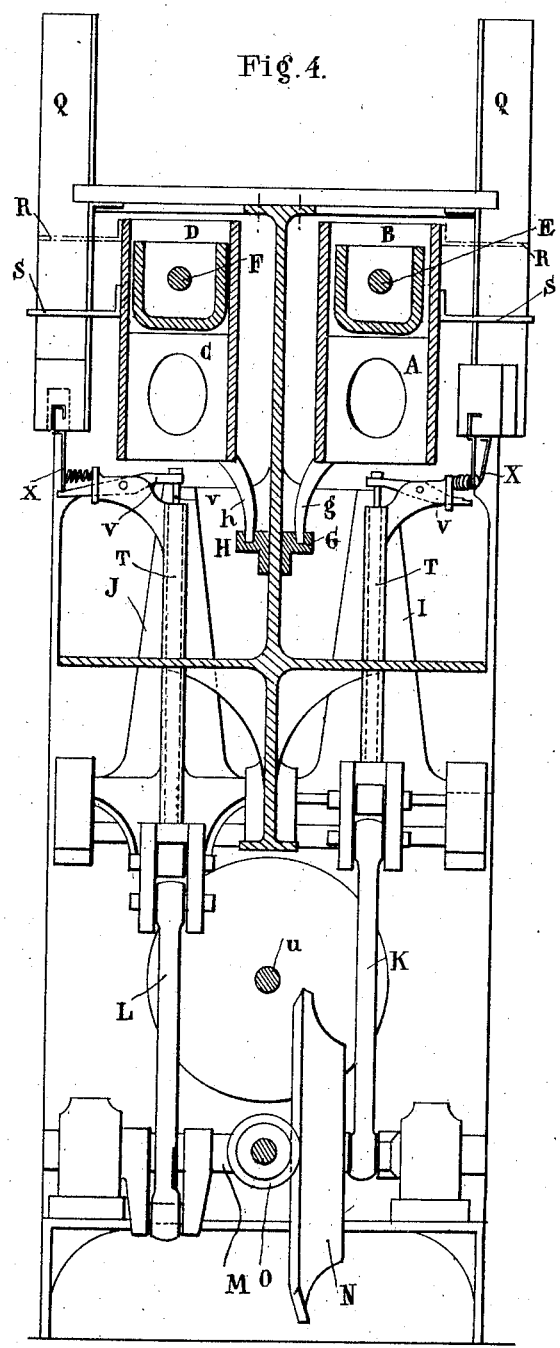
Fig. 4 is a section taken along the line 4—4 of Fig. 5.

Assume, in principle, two carriages A and B shown diagrammatically in Fig. 1. To one of them are secured for example two molds $a^1$ $a^2$, to the other the corresponding matrices $b^1$ $b^2$. (It can also quite well be assumed moreover that, to each of the carriages are secured a greater number of molds, four, six, in general an even number, in the longitudinal direction of the carriage). Fig. 2 enables the generalization of this principle to be gathered.

In order to define the principle, the reasoning will be based on the diagram Fig. 1. Now, if it is assumed that the mold-carrying carriages A and B have synchronous horizontal movements of equal amplitude, but in different directions such that, for example, when the carriage A is displaced in the direction of the arrow 1, the carriage B is displaced according to the arrow 2, then the mold $a^1$ enters the matrix $b^1$, while, on the return, it is $a^2$ which co-acts with $b^2$. It is henceforth understood that the return movement is utilized and does not act idly as in single-acting presses, which amounts to saying that, with an equal rate of revolution, the apparatus based on this principle gives an output, double, quadruple, etc., that of single-acting presses according to the number of molds mounted on the carriage, or that, with an equal output, the carriage of a single-acting press must stamp respectively twice or four times as rapidly.

It has still to be remarked that if the carriages A and B are approximately of the same weight, the impact which is experienced in single-acting presses is here distributed, or rather converted into reaction in the interior of the structure.

Each set of two carriages (Figs. 1 and 2) can be duplicated or multiplied by one or more parallel sets C D (Fig. 5); this being the case which has been taken as an example, but nothing prevents eventually triplicating, quadrupling, etc., it, by means of the same operating shaft M.

If the cranks of this operating shaft M (Figs. 3 and 4) are keyed at suitable angles, the cadence of the stamping will be produced, not simultaneously, but at equal intervals during the period; for example with two sets of carriages, say four molds, as shown in the drawings, if the levers accomplish their full to and fro displacement in one second, the cadence will be 1. 2. 3. 4 the intervals being of $\frac{1}{4}$ of a second. If there were four sets of two, say eight molds, the intervals would not be more than $\frac{1}{8}$ of a second, and so on; the greater the number, the more uniform the action of the machine, without the speed of stamping (*i. e.* the speed of displacement of the mold-carrying carriages) increasing.

*The stamping mechanism.*—The diagrammatic parts A and B of Fig. 1 are shown again in Figs. 3, 4 and 5, which show, by way of example, a quadruple machine. Fig. 3 shows, in elevation, a set of carriages, the mechanism of the second set, situated behind is identical, in the neighboring position of the oscillating parts (Fig. 5); the carriages of this second set are respectively C and D (Figs. 4 and 5).

In each set one of the carriages penetrates into the other (B into A, D into C) and each set slides respectively on one of two cylindrical rods E F (Figs. 4 and 5) which serve at the same time to support them. This interpenetration is however not indispensable, as any other form of carriages which do not interpenetrate can be imagined.

The carriages are moreover guided by horizontal grooves G H (Figs. 3 and 4) in which vertical flanges $g$, $h$ of the mold carriers slide. They are actuated respectively by bell-crank levers I J, oscillating on pivots $i$ $j$, which carry at their upper end, slide blocks sliding on suitable surfaces.

Each group of two levers is operated, as shown by the drawings, by a connecting rod K (Fig. 3), K, L (Fig. 4): these connecting rods receive their motion from a shaft M (Figs. 3 and 4) cranked at 90°, rotated itself by a pair of bevel wheels N O (Figs. 3 and 4); driven by a pulley P (Figs. 3 and 5).

*The cutting and distributing mechanism.*—Each pair of molds is served by a similar mechanism. It is therefore sufficient to describe one only:

A vertical chute Q (Figs. 3 and 5) is secured on the structure in any manner and serves to receive the bar of soap. To the front cheek of the carriage A (Figs. 3, 4, 5) are secured two brackets, one carries the horizontal blade R which slices the bar of soap, the other a bracket S (Figs. 3, 4, 5) which, at one time constitutes a bottom to the hopper when the blade R slices the bar, and at another time is retracted to permit the piece cut to fall. It is at this instant that the blade R slices the bar while temporarily supporting the upper portion thereof. It is thus seen that the first phase (cutting) entirely resolves itself into a simple guillotine and trap action.

In order to permit the action of the cutting blades R and the brackets S, the vertical guides and the adjacent portions of the frame are provided with suitable slots $R_1$ and $S_1$.

The piece cut falls into the lower portion $q$ of the chute (Fig. 3) where the distributer comes to take it at the appropriate instant.

This rotary distributer consists of a vertical tube T (Fig. 3) capable of turning about its axis, and actuated by a cam U, keyed on a shaft $u$ (Figs. 3 and 6) and which thrusts a wing $u^1$ (Fig. 6), fast on the tube. This is returned in the contrary direction by a spring $u^2$ (Fig. 3). The upper end of the tube is provided with a lateral arm supporting a lever V (Fig. 3) operating a spring clamp X (Fig. 3) serving to retain the piece of soap. A thin rod $v$, connected to this lever and which extends through the entire length of the tube, exerts, as it moves down, an upward pressure through the medium of the lever V on the base of the spring clamp X, whereby the clamp is opened. The clamp automatically closes itself on releasing the rod.

The rod $v$ is pivoted at its lower end to a lever $u^4$ (Fig. 6) which has pivoted thereon a roller $u^5$. A cam $u^3$ carried by the shaft $u$ forces the said roller $u^5$ down, whereby the rod $v$ is moved vertically down. As soon as the action of the came $u^3$ ceases, the spring clamp X by reason of its elasticity returns the rod $v$ to its original position.

The action is as follows: In the position of Fig. 3, the piece of soap 3 is on the point of being caught by the two parts of the mold which approach one another, and in consequence is held by them. At this instant the cam $u^3$ (Fig. 6) lowers a lever $u^4$ and thus opens the clamp X, as explained above. The piece of soap, or other article when being released by the spring clamp X is at the same moment seized by the molds of the two carriages A, B. Immediately thereafter, the cam U, in thrusting the wing $u^1$ (Figs. 3 and 6), turns the distributer and brings same beneath the chute $q$ where a new piece of soap awaits it. In continuing its rotation, the cam permitting the roller $u^5$ to move toward the shaft $u$, makes the return movement of the rod $v$ and consequently the closing of the spring clamp X possible, which clamp closes over the piece of soap, or other article, at the moment when it falls into the chute $q$, as shown by the left-hand portion of Fig. 4, under the action of the cam U combined with that of the spring $u^2$, the distributer brings the soap into axial alinement with the mold, at the place shown on the left-hand side of Fig. 3.

The soap once pressed, detaches itself from the mold during the return movement, either by gravity or by any known method.

What I claim is:

1. Automatic machine for cutting in pieces bars of soap or similar articles, and molding the pieces thus obtained, comprising in combination with the frame of the machine, a central horizontal carriage, a mold carried on each end of said carriage, a second carriage, means for imparting a straight to and fro movement to both said carriages in opposite directions, molds provided on said second carriage corresponding to the molds on said central carriage, a vertical guide for the bar of soap, or other article, to be cut, cutting means including two sets of horizontal blades secured to each carriage, each set comprising a cutting blade and a supporting blade adapted to move in slots provided in said frame and said vertical guides, the said blades constituting a guillotine and trap device.

2. In a machine as set forth in claim 1, distributing means for the cut and molded article, comprising a tube adapted to turn about its vertical axis, wings provided at the lower end of said tube, a retraction spring, a rotary shaft, a cam secured to said shaft for operating said wings, a slide rod within said tube, a lever pivotally connected with the lower end of said rod, a roller carried by said lever, a second cam carried by said rotary shaft for operating said lever, a spring-clamp secured to an extension at the upper end of said tube so as to bear with its base against the end of a lever pivoted to said extension and said slide rod.

In testimony wherof I have affixed my signature in the presence of two witnesses.

GUSTAVE BRUNET.

Witnesses:
 F. Y. ZABRECH,
 EMILE VAN MANRECH.